United States Patent [19]
Petrusek

[11] 3,738,054
[45] June 12, 1973

[54] ANIMAL ACTION TOY

[76] Inventor: Victor Petrusek, 14611 Halsted Street, Harvey, Ill. 60426

[22] Filed: Nov. 11, 1971

[21] Appl. No.: 197,850

[52] U.S. Cl. .................................................. 46/141
[51] Int. Cl. ............................................. A63h 13/02
[58] Field of Search .................... 46/141, 135, 154, 46/1

[56] References Cited
UNITED STATES PATENTS
325,141   9/1885   Wilke .................................... 46/141
2,932,125 4/1960   McAllister ........................ 46/135 R

*Primary Examiner*—Hugh R. Chamblee
*Assistant Examiner*—J. Q. Lever
*Attorney*—Sabin C. Bronson

[57] ABSTRACT

Animal Action Toy comprising a body formed of resilient material in the shape of an animal's head which upon compression opens its mouth as if to catch a bug, nut, or other smaller animal, tethered to one end of an elastic or rubber chord, the other end being attached to the roof of the animal's mouth, whereby the bug or the like may be tossed away from the animal's head, the head compressed to open the animal's mouth, and the bug caught in the animal's mouth on rebound.

3 Claims, 4 Drawing Figures

PATENTED JUN 12 1973 3,738,054
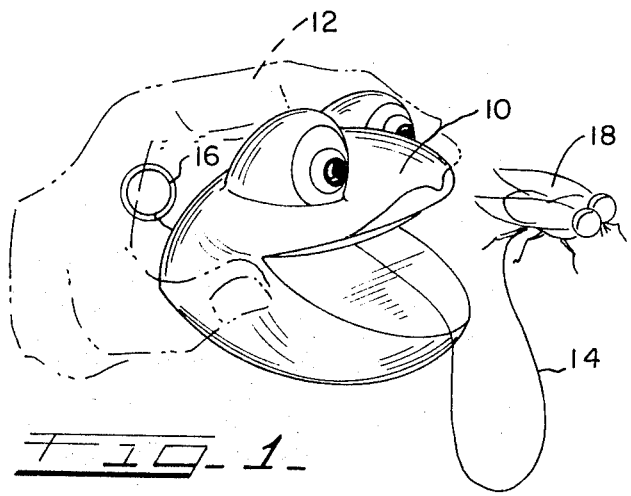
Fig-1.
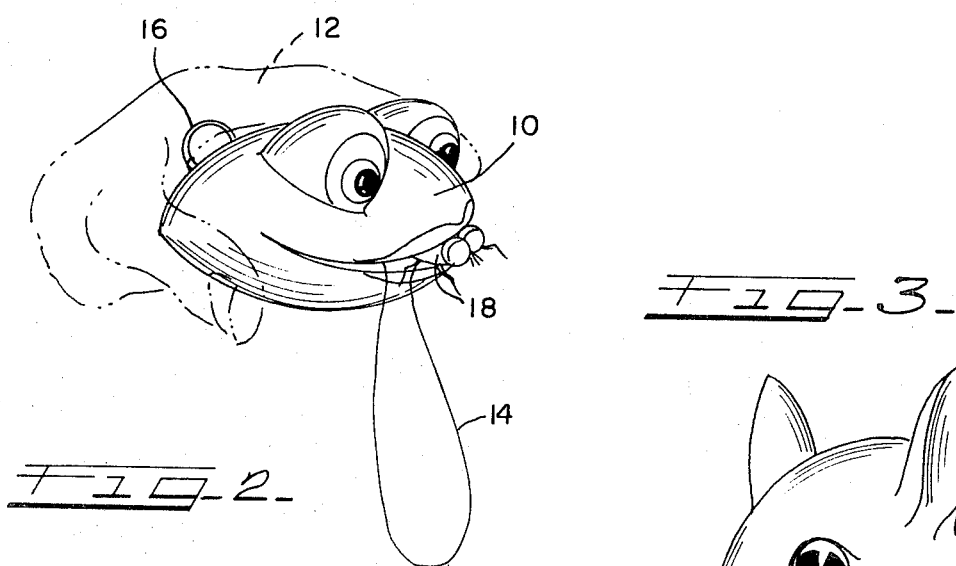
Fig-2.
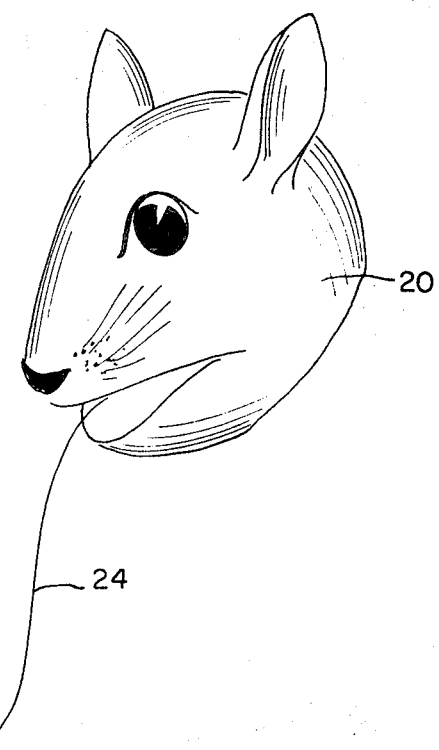
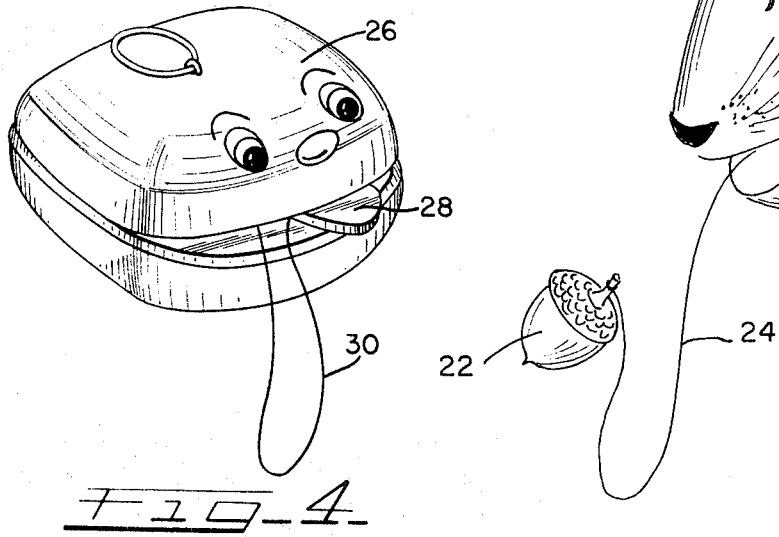
Fig-4.
Fig-3.

ANIMAL ACTION TOY

BACKGROUND - SUMMARY - DRAWINGS

This invention is an improvement over the invention shown and described in my copending application Ser. No. 159,846, filed July 6, 1971. Most of the toys of this type use a ball attached to one end of an elastic string or cord and a cup or container attached to the other end of the container, so that the ball can be thrown out and then caught in the container when the ball rebounds. Such toys are used for the most part by children of rather young age, and my improvement is to provide such a toy which simulates a well known animal catching its prey, and the child must manipulate the animal's head at the right time so that its mouth will be open ready to catch the prey on its rebound toward the animal's head. This necessitates additional skill and coordination as the animal's mouth must close about the prey if and when the child is skillful enough to maneuver the head so that the returning prey enters the animal's mouth and then closes about the prey.

The invention will be best understood by reference to the accompanying drawings forming part of this application and wherein like letters of reference refer to like parts throughout the several views.

In the drawings;

FIG. 1 is a perspective view of an animal's head, in this instance a frog, compressed so that its mouth is open in the act of catching a fly, attached to an elastic string, on its rebound to the animal's head;

FIG. 2 is a view similar to FIG. 1 but with the animal's mouth closed about the fly;

FIG. 3 is a view similar to FIG. 1 but of a squirrel's head in the act of securing an acorn, FIG. 4, is a view similar to FIG. 1, but of a simulated sandwich in the act of catching a pickle on the end of an elastic cord or string.

DESCRIPTION OF THE PREFERRED EMBODIMENT

Referring now to the drawings in detail, particularly FIGS. 1 and 2, it will be noted that a simulation of a frog's head is shown at 10, and a person's hand is indicated in phantom lines at 12 holding the toy. As indicated in the above abstract, the animal's head is formed of resilient material so that when the sides are squeezed or compressed, the mouth opens, and when such stress is released the mouth quickly closes due to the resilience of the material of which it is formed.

There is a small opening or aperture through the roof of the head of the animal through which an elongated elastic cord or string 14 extends and at the end of the string passing through the head is secured a ring 16 which attaches the elastic string 14 to the head.

The other end of the string 14 is attached to a simulation of a fly 18, which is a common prey of a frog in nature. This fly is cast of a material that will have some weight and when the operator throws it out it will have enough weight to stretch the string and the elasticity of the string will draw the fly back toward the head. Meanwhile the operator has compressed the head so that the mouth is open ready to catch the fly on its return flight to the head, providing the operator is dexterous enough to maneuver the head so as to cause the fly to land in the open mouth of the frog on its return flight. This is the main object of the toy.

There may be times when the operator will want the frog to jump along with him as he is walking, running or rimply standing still. In this event the operator places the ring 16 on a finger and then lets the head 10 fall downwardly and keeps bouncing it up and down at will. There are many variants of this, limited only by the operator's imagination and the frog can be made to do tricks, such as jumping in your hand, on a table etc.

It makes no difference what animal's head is simulated for the toy; it can be a king-fisher's head and a fish; a crow's head and a kernel of corn; or a squirrel's head as indicated at 20 in FIG. 4 with an acorn 22 at the end of the elastic cord 24. In fact, any animal's head or anybody could be simulated to make the toy with whatever pray or article is common for the animal or body used, such as a sandwich as shown at 26 which would open upon compression of its sides and a pickle 28 at the end of the elastic cord 30.

Having thus described the invention with the requisite particularity, it is believed that one versed in the art can make and use the same by following the specification in connection with the drawing.

Having thus described my invention what I claim and desire to secure by Letters Patent is:

1. A toy comprising an integral hollow body, such as an animal's head, formed of resilient material, having a normally closed narrow opening at one end thereof, openable upon lateral compression of said body, an aperture through said body rearwardly of said opening, and an elastic cord extending through said narrow opening into said hollow body, and through said aperture, and terminating in a loop, and an article attached to the other end of said cord.

2. The structure as defined in claim 1 wherein said loop comprises a ring adapted to fit a finger of the operator of the toy.

3. The structure as defined in claim 1 wherein the body is a sandwich and the article attached to the cord a pickle.

* * * * *